United States Patent
Moyal et al.

(10) Patent No.: US 12,464,429 B2
(45) Date of Patent: Nov. 4, 2025

(54) PARALLEL CONNECTION FOR DEVICE TRANSACTIONS

(71) Applicant: INTERNATIONAL BUSINESS MACHINES CORPORATION, Armonk, NY (US)

(72) Inventors: Shailendra Moyal, Pune (IN); Sarbajit K. Rakshit, Kolkata (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 17/932,722

(22) Filed: Sep. 16, 2022

(65) Prior Publication Data
US 2024/0098601 A1 Mar. 21, 2024

(51) Int. Cl.
*H04W 36/30* (2009.01)
*G06Q 20/32* (2012.01)
*H04W 36/00* (2009.01)
*H04W 36/14* (2009.01)

(52) U.S. Cl.
CPC .......... *H04W 36/30* (2013.01); *G06Q 20/325* (2013.01); *H04W 36/008375* (2023.05); *H04W 36/14* (2013.01)

(58) Field of Classification Search
CPC ......... H04W 36/30; H04W 36/008375; H04W 36/14; G06Q 20/325; G06Q 20/322
USPC .......................................... 370/331; 455/312
See application file for complete search history.

(56) References Cited

U.S. PATENT DOCUMENTS

| | | | |
|---|---|---|---|
| 10,659,569 B1* | 5/2020 | Tourrilhes | H04L 61/2514 |
| 11,159,978 B2 | 10/2021 | Soma | |
| 2011/0292803 A1* | 12/2011 | Nishioka | H04W 8/18 370/236 |
| 2012/0113862 A1* | 5/2012 | Santhanam | H04W 84/045 370/332 |

(Continued)

FOREIGN PATENT DOCUMENTS

WO 2022084457 A1 4/2022

OTHER PUBLICATIONS

Bao et al., "Intelligent Software-Defined Mesh Networks with Link-Failure-Adaptive Traffic Management", https://ieeexplore.ieee.org/document/8249869, Jun. 2018, pp. 1-15.

(Continued)

*Primary Examiner* — Marcos Batista
(74) *Attorney, Agent, or Firm* — Tihon Poltavets

(57) ABSTRACT

A method for parallel connection for device transactions includes stablishing a first connection to perform a transaction by a client device. The method also includes identifying a plurality of available connections supported by the client device to perform the transaction. The method also includes initializing the plurality of available connections to perform the transaction, wherein each available connection represents a parallel connection to the first connection. The method also includes identifying at least one potential connectivity issue with the first connection based on a comparison between historical network data for the first connection and current network data for the first connection. The method also includes performing a handoff of the transaction between the first connection and a second connection from the plurality of available connections.

20 Claims, 3 Drawing Sheets

(56) References Cited

U.S. PATENT DOCUMENTS

| | | |
|---|---|---|
| 2015/0181486 A1 | 6/2015 | Vallabhu |
| 2021/0235369 A1 | 7/2021 | Koshy |
| 2023/0231785 A1* | 7/2023 | Kumar .................. H04L 41/069 709/224 |

OTHER PUBLICATIONS

Cuissard et al, "Wireless Link Aggregation to Provide an Efficient and Smooth Multi-Protocol Data Link", https://dl.acm.org/doi/10.1145/2630088.2630095, Apr. 2021, pp. 1-5.

Wamser et al., "Dynamic bandwidth allocation for multiple network connections: improving user QoE and network usage of YouTube in mobile broadband", https://dl.acm.org/doi/10.1145/2630088.2630095, 2014, pp. 1-6.

* cited by examiner

PARALLEL CONNECTION FOR DEVICE TRANSACTIONS

BACKGROUND

This disclosure relates generally to device transactions, and in particular to providing parallel connectivity for device transactions to handle connectivity issues.

Mobile device transactions are prominently utilized for online purchases, where a user of the mobile device can perform a transaction via a web browser or a dedicated application for an online purchase. Furthermore, mobile device transactions are prominently utilized for instore purchases through a digital wallet, where a user of the mobile device can perform a transaction by wirelessly passing digital wallet credentials between the mobile device and a merchant's terminal via near field communication (NFC). Typically, when an online or in-person transaction is initialized via the mobile device and a connectivity issue occurs, the transaction is either restarted or canceled all together. The mobile device typically includes multiple types of connections which can be utilized to perform the transaction.

SUMMARY

Embodiments in accordance with the present invention disclose a method, computer program product and computer system provide a parallel connection for device transactions, the method, computer program product and computer system can establish a first connection to perform a transaction by a client device. The method, computer program product and computer system can identify a plurality of available connections supported by the client device to perform the transaction. The method, computer program product and computer system can initialize the plurality of available connections to perform the transaction, wherein each available connection represents a parallel connection to the first connection. The method, computer program product and computer system can identify at least one potential connectivity issue with the first connection based on a comparison between historical network data for the first connection and current network data for the first connection. The method, computer program product and computer system can perform a handoff of the transaction between the first connection and a second connection from the plurality of available connections.

DETAILED DESCRIPTION

Figure 1:
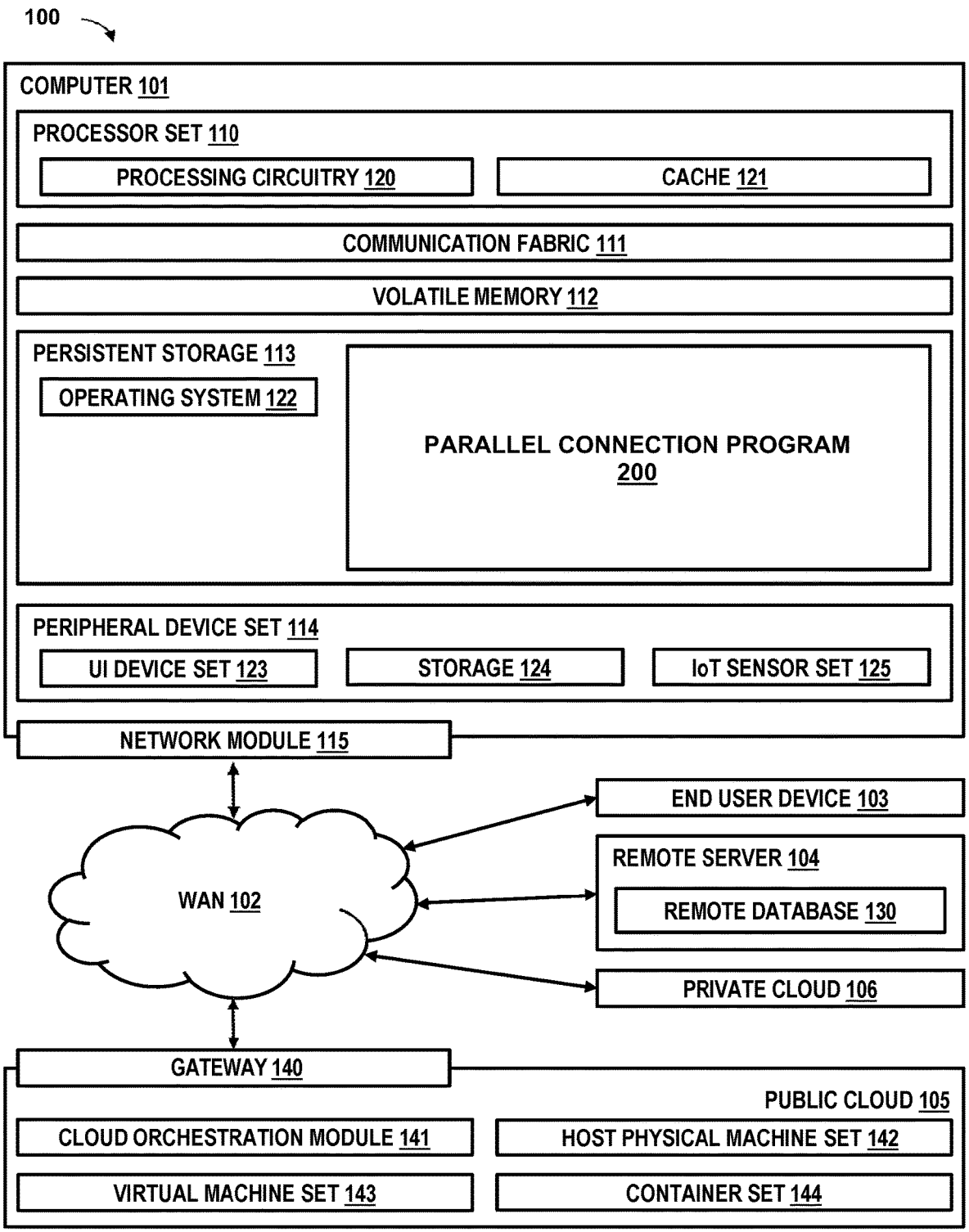
FIG. 1 is a functional block diagram illustrating a computing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

An electronic device, such as a smartphone or tablet computer, can utilize various types of network connectivity, such as but limited to, Wi-Fi™, Bluetooth®, NFC, and Infrared, where multiple instances of each type of network connectivity can be present (e.g., two Wi-Fi™ networks). The electronic device can utilize a connectivity aggregator operating a parallel connection program to combine all the available connections into a single connection. The connectivity aggregator can aggregate different connectivity protocols to make a single connection. Embodiments of the present invention can utilize an individual connectivity protocol to perform parallel data transfer and decide which protocol is to be utilized for the connection. Based on historical learning with regards to different types of network unavailability and connectivity issues, embodiments of the present invention the proposed system various types of network unavailability and connectivity issues during a transaction. Embodiments of the present invention proactively initiate at least one parallel backup connection with the device, so that if a connection is lost, there is a seamless transition between the lost connection and the at least one parallel backup connection. Embodiments of the present invention proactively registers the device to participate into aggregator system to enable extended network efficiency based on a type of network device, a connection range from an aggregator device to other device, a type of supported connection, and an estimated time required to create aggregated channel. While the registered device contributes to network efficiency, embodiments of the present invention can detect the movements and predict when the device leaves a defined boundary for a connection type and can proactively perform a handoff of the ongoing activity onto another aggregated channel.

Embodiments of the present invention can identify priority of any transaction for any device and predict any a probability for network unavailability or connectivity issues, and proactively be establish an appropriate number of parallel connections with the device, such that the device is always connected. For a device with multiple ports to connect via multiple modes of connectivity, embodiments of the present invention can aggregate the connections to make one connection so that connectivity is not lost, and a seamless transition occurs between the various connections of the parallel connectivity. Embodiments of the present invention can identify which devices require parallel connectivity in a multi-device ecosystem, such that the available parallel connectivity is utilized in an optimum manner among the devices in the surrounding ecosystem. Utilizing a contextual analysis module, embodiments of the present invention can identify which devices is a priority device or which activity is priority activity and can ensure appropriate bandwidth allocation for different parallel connections based on a level of priority.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as parallel connection program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
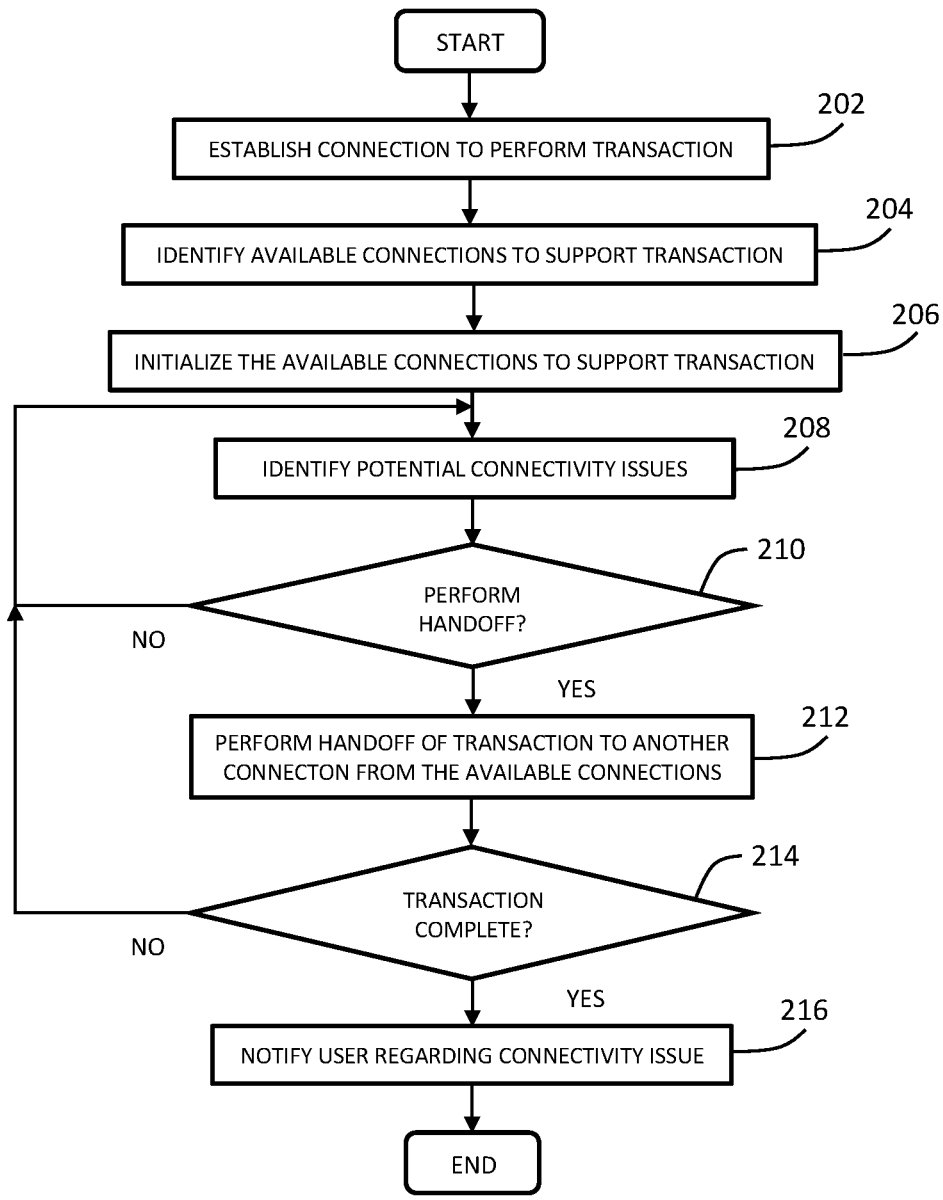
FIG. 2 depicts a flowchart of a parallel connection program for managing parallel connections for transactions during potential connectivity issues, in accordance with an embodiment of the present invention.

FIG. 2 depicts a flowchart of a parallel connection program for managing parallel connections for transactions during potential connectivity issues, in accordance with an embodiment of the present invention.

Parallel connection program 200 establishes a connection to perform a transaction (202). A user performing a transaction with a client device via a communication network, where the communications network can be Wi-Fi™, cellular network, Bluetooth®, near-field communication (NFC), sound signal-based, short message service (SMS), magnetic secure transmission (MST), and/or infrared-based. Parallel connection program 200 establishes a connection between the client device associated with the user and a communication network to perform the transaction. In one embodiment, a user with a mobile device is shopping in a retail location and attempts to pay for a purchase utilizes a payment method in a digital wallet present on the mobile. As the user activates the payment method in the digital wallet utilizes one or more verification techniques, parallel connection program 200 establishes a connection between the mobile device and a merchant's terminal at the retail location utilizing NFC. In another embodiment, a user with a mobile device is shopping online utilizing a retail application on the mobile device, where the user attempts to pay for a purchase utilizing an inputted payment method in the retail application. Since the user was already utilizing the retail application while shopping online, parallel connection program 200 determines the connection utilized for the retail application (e.g., Wi-Fi™) is also to be utilized to perform the transaction. In this embodiment, subsequent to the user selecting to process the inputted payment method, parallel connection program 200 establishes the connection to the Wi-Fi™ communications network.

Parallel connection program 200 identifies available connections to support the transaction (204). Parallel connection program 200 identifies available connections to support the transaction based on one or more parameters that include a transaction type, one or more features of the client device performing the transaction, a connection range between the client device and another device required for a transaction (e.g., merchant terminal, wireless modem), and an estimated time to initialize the available connection. The transaction type represents a transaction requiring a communications network to perform the transaction can include but is not limited to an online purchase in a web browser on a client device, an online purchase in an application on a client device, a client device to merchant's point of purchase (POP) device (e.g., mobile device, merchant terminal), and a text message (i.e., SMS) based purchase. Features of the client device represent the various communication networks through which the client device can perform the transaction given the transaction type. As previously discussed, the various communication networks can include but are not limited to Wi-Fi™, cellular network, Bluetooth®, near-field communication (NFC), sound signal-based, short message service (SMS), magnetic secure transmission (MST), and infrared-based. A connection range between the client device and the other device required for the transaction represents a threshold distance for a reliable connection without intermittent and/or connection failures. For example, a threshold distance for an NFC connection can be 4 cm or less between the client device and a transaction processing device required for the transaction. An estimated time to initialize the available connection represents a duration the client device requires to establish the parallel connection (i.e., channel) for the current transaction. The estimated time can be based on historical communication network data for each communication network type, where the historical communication network data includes initialization times associated with a time of day, a day of the year, and/or an amount of existing communication network traffic from other electronic devices.

From a previously discussed example, parallel connection program 200 established a connection between a mobile device and a merchant's terminal at the retail location utilizing NFC. Parallel connection program 200 identifies available connections to support the transaction based on a transaction type and one or more features of the mobile device performing the transaction. Parallel connection program 200 determines that in addition to NFC, the mobile device supports Wi-Fi™, cellular network, Bluetooth®, and short message service (SMS) communication networks. Parallel connection program 200 also determines the mobile device and the merchant's terminal at the retail location represents a client device to merchant's point of purchase (POP) device transaction type, where the merchant's terminal is utilizing a local Wi-Fi™ network at the retail location. Since the mobile device supports utilizing a Wi-Fi™ communication network, parallel connection program 200 identifies the available connection to support the transaction as the local Wi-Fi™ network at the retail location. Parallel connection program 200 can utilize the Wi-Fi™ network as a parallel connection to seamlessly transition between communication networks to perform the transaction in the event the NFC connection between the mobile device and the merchant's terminal becomes intermittent and/or fails.

From another previously discussed example, parallel connection program 200 established a connection between a mobile device and an online retailer utilizing a local Wi-Fi™ communications network. Parallel connection program 200 identifies available connections to support the transaction based on a transaction type and one or more features of the mobile device performing the transaction. Parallel connection program 200 determines that in addition to Wi-Fi™, the mobile device supports cellular network, Bluetooth®, NFC, and short message service (SMS) communication networks. Parallel connection program 200 also determines the mobile device and online retailer transaction represents am online purchase in a web browser on a client device transaction type. Since the mobile device support utilizing a cellular network, parallel connection program 200 identifies the available connection to support the transaction as the cellular network associated with the mobile device. Parallel connection program 200 can utilizes the cellular network as a parallel connection to seamlessly transition between communication networks to perform the transaction in the event Wi-Fi™ connection between the mobile device and the local modem or network becomes intermittent and/or fails.

Parallel connection program 200 initializes the available connections to support the transaction (206). In one embodiment, parallel connection program 200 utilizes historical learning to determine when to initialize the available connections to support the transaction. In one example, parallel connection program 200 determines a distance between a mobile device and a merchant's terminal for processing mobile payments, where the distance is approaching the NFC connection range with a threshold distance of 4 cm. Parallel connection program 200 determines to initialize the available connection of a local Wi-Fi™ network to support the transaction based on the determined distance approaching the threshold distance for the connection range. Parallel connection program 200 initializes a connection with the local Wi-Fi™ network, where the local Wi-Fi™ network supports parallel channel communications for transactions between mobile devices and the merchant's terminal. In another embodiment, parallel connection program 200 determines the user of the mobile device is attempting to complete an online transaction utilizing a public Wi-Fi™ network at an airport terminal, where based on the historical data, the public Wi-Fi™ is experiencing peak network traffic. Parallel connection program 200 determines to initialize the available connection of a cellular network to support the online transaction based on a likelihood of an intermittent or failed connection due to high network traffic, while processing the online transaction. Parallel connection program 200 initializes a connection with the cellular network, where the mobile device can transition between the public Wi-Fi™ network at the airport terminal and the cellular network to perform the online transaction.

In another embodiment, parallel connection program 200 utilizes a contextual module to determine priority for each transaction and/or each device performing a transaction and allocating a set amount of bandwidth to a specific transaction and/or device performing a transaction with a high priority. In one example, parallel connection program 200 determines a user is attempting to utilize a mobile device as a boarding pass at a gate in an airport terminal, where parallel connection program 200 establishes an NFC connection to perform a transaction between the mobile device and a merchant's terminal (i.e., airline boarding pass reader). Parallel connection program 200 identifies a public Wi-Fi™ network at the airport terminal as an available connection to support the transaction and with the contextual module, determines the user utilizing the mobile device as a boarding pass requires priority for the transaction to ensure the boarding process is not delayed. Parallel connection program 200 initializes a parallel connection through the public Wi-Fi™ network and allocates a set amount of bandwidth to the mobile device being utilized as a boarding pass at the gate in the airport terminal. Subsequent to completing the transaction, parallel connection program 200 releases the allocated bandwidth and the bandwidth is available for the other electronic devices utilizing the public Wi-Fi™ network.

Parallel connection program 200 identifies potential connectivity issues (208). In one embodiment, parallel connection program 200 identifies potential connectivity issues by comparing historical network data to current network data. As previously discussed, the historical network data can include an amount of existing communication network traffic, where the amount of existing communication network traffic represents an amount of network bandwidth being utilized by various devices at a given point in time. Parallel connection program 200 utilizes the historical network data to identify intervals of high bandwidth usage that can result in intermittent and/or failed connectivity of client devices utilizing the communication network. If parallel connection program 200 determines the transaction being performed is occurring during an interval of high bandwidth usage for the current communication, parallel connection program 200 identifies potential connectivity issues for the client device performing the transaction. In another embodiment, parallel connection program 200 identifies potential connectivity issues by determining a distance between the client device and a transaction processing device (e.g., merchant's terminal) required to perform the transaction. As previously mentioned, a threshold distance for an NFC connection is 4 cm between the client device and the transaction processing device required for the transaction based on historical data for a reliable connection. If parallel connection program 200 determines the client device is crossing a threshold distance range (i.e., 4 cm<x<3 cm) and is positioned 3.5 cm from the transaction processing device, parallel connection program 200 identifies potential connectivity issues for the client device performing the transaction. Other threshold distances for other network connection types can include 3 inches for MST connections and 10 meters for infrared connections.

Parallel connection program 200 determines whether to perform a handoff between the current connection and the available connections (decision 210). In the event parallel connection program 200 determines to perform the handoff between the current connection and the available connections ("yes" branch, decision 210), parallel connection program 200 performs the handoff of the transaction to another connection from the available connections (212). In the event parallel connection program 200 determines not to perform the handoff between the current connection and the available connections ("no" branch, decision 210), parallel connection program 200 reverts to identifying potential connectivity issues (208).

Parallel connection program 200 determines whether to perform a handoff between the current connection and the available connections based on at least one available connection being more stable than the current connection with identified connectivity issues. A more stable connection represents a network connection with a lower likelihood of intermittent connectivity and/or connectivity failure. In one embodiment, parallel connection program 200 performs a comparison between predicated bandwidth availability between the current communication network and predicted bandwidth availability between each of the available connections to determine whether to perform the handoff between the current communication network and another connection from the available connections. Based on the comparison, parallel connection program 200 determines the predicted bandwidth availability of at least one available connection from the available connections is greater than the predicted bandwidth availability of the current connection. Based on the predicted bandwidth availability comparison, parallel connection program 200 determines to perform the handoff of the transaction to the available connection with the greater predicted bandwidth availability.

Parallel connection program 200 performs the handoff of the transaction to another connection from the available connections (212). Parallel connection program 200 performs the handoff of the transaction from the current network connection with identified potential connectivity issues to another network connection from the available network connections. From a previously discussed example, parallel connection program 200 established a connection between a mobile device and a merchant's terminal at the retail location utilizing NFC. Parallel connection program 200 initializes a connection with a local Wi-Fi™ communication network and identifies potential connectivity issues with the NFC connection between the mobile device and the merchant's terminal, due to parallel connection program 200 determining the mobile device has crossed into a threshold distance range (i.e., 4 cm<x<3 cm) with respect to the merchant's terminal. Parallel connection program 200 determines to perform the handoff based on a comparison between the NFC connection and the local Wi-Fi™ communication network and performs the handoff of the transaction between the NFC connection and the local Wi-Fi™ communication network. The mobile device of the user and the merchant's terminal can continue to pass encrypted information back and forth to each other to complete the transaction without interrupting the transaction being performed.

From another previously discussed example, parallel connection program 200 established a connection between a mobile device and an online retailer utilizing a local Wi-Fi™ communication network. Parallel connection program 200 initializes a connection with a cellular network and identifies potential connectivity issues with the local Wi-Fi™ communication network due to peak bandwidth usage by other client devices connected to the local Wi-Fi™ communication network. Parallel connection program 200 determines to perform the handoff based on a comparison between the local Wi-Fi™ communication network and the cellular network, where parallel connection program 200 determines the cellular network can provide a more stable connection compared to the local Wi-Fi™ communication network. Parallel connection program 200 performs the handoff of the transaction between the local Wi-Fi™ communication network and the cellular network, where can continue to pass encrypted information back and forth to with a remote server to complete the transaction without interrupting the transaction being performed.

In yet another example, parallel connection program 200 established an NFC connection between a mobile device and a merchant's terminal (i.e., airline boarding pass reader), where the user is utilizing the mobile device as a boarding pass at a gate in an airport terminal. Parallel connection program 200 identifies a public Wi-Fi™ network at the airport terminal as an available connection to support the transaction and initializes a parallel connection through the public Wi-Fi™ network. Parallel connection program 200 prioritizes the mobile device utilized as a boarding pass at the gate in the airport terminal and allocates a set amount of bandwidth to the mobile device to ensure the boarding process at the gate is not delayed. Lower priority electronic devices utilizing the public Wi-Fi™ network can include a user streaming a video on a smartphone or a user viewing social media content on a tablet computer. Parallel connection program 200 identifies potential connectivity issues with the NFC connection between the mobile device and the merchant's terminal and determines to perform a handoff of the transaction to the public Wi-Fi™ network at the airport terminal due to the allocated bandwidth for the mobile device. Parallel connection program 200 performs the handoff of the transaction between the NFC connections and the local Wi-Fi™ communication network. The mobile device of the user utilizes the allocated bandwidth until the transaction is complete (i.e., the boarding pass is scanned by the airline boarding pass reader). Subsequent to completing the transaction, parallel connection program 200 releases the allocated bandwidth and the bandwidth is available for the other electronic devices utilizing the public Wi-Fi™ network.

Parallel connection program 200 determines whether the transaction is complete (decision 214). In the event parallel connection program 200 determines the transaction is complete ("yes" branch, decision 214), parallel connection program 200 notifies the user regarding the connectivity issue (216). In the event parallel connection program 200 determines the transaction is not complete ("no" branch, decision 214), parallel connection program 200 reverts to identifying potential connectivity issues (208).

Parallel connection program 200 notifies the user regarding the connectivity issue (216). In one embodiment, parallel connection program 200 creates a report identifying the transaction, an initial connection utilized to initiate the transaction, an available connection utilized to complete the transaction, and a reason for the transaction handoff between the initial connection and available connection (e.g., mobile device was held too far from a merchant's terminal to provide a stable NFC connection). Parallel connection program 200 notifies the user regarding the created report via one or more delivery methods including but not limited to a text message, an email, and a list accessible by a user of parallel connection program 200. In some embodiments, parallel connection program 200 allows for a user to identify which communication network and which protocols for each communication network can or cannot be used for parallel network connections when handling transaction. For example, the user can specify to exclude utilizing Bluetooth® as a network connection or to exclude a specific Wi-Fi™ communication network when more than one is present at a given location.

Figure 3A:
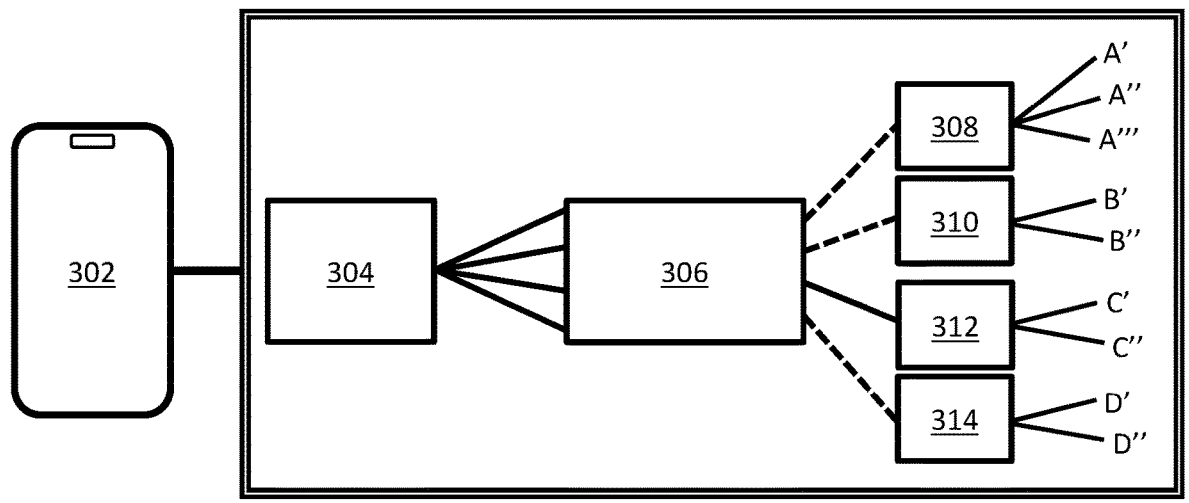
FIG. 3A depicts an illustrative example of a parallel connection program identifying multiple available connections for transactions during potential connectivity issues, in accordance with an embodiment of the present invention.

FIG. 3A depicts an illustrative example of a parallel connection program identifying multiple available connections for transactions during potential connectivity issues, in accordance with an embodiment of the present invention. In this example, mobile device 302 utilizes connectivity aggregator 304, where parallel connection program 200 operates on connectivity aggregator 304 and receives various connectivity protocols at protocol receiver 306 from the different types of network protocols. The different types of network protocols of mobile device 302 include Wi-Fi™ 308, Bluetooth® 310, NFC 312, and infrared 314. Furthermore, each type of network protocol can include multiple network connections. Wi-Fi™ 308 includes three types of available network connections, designated A', A", and A'", Bluetooth® 310 includes two types of available network connection designed B' and B", NFC 312 includes two types of available network connection designed C' and C", and infrared 314 includes two types of available network connection designed D' and D". In this example, a user of mobile device 302 is performing an instore purchase, where the user is utilizing a digital wallet on mobile device 302 to complete a transaction with a merchant's terminal via NFC. As the user places initiates the digital wallet on mobile device 302, parallel connection program 200 establishes a connection to perform the transaction utilizing NFC 312 on mobile device 302. Parallel connection program 200 identifies and initializes available parallel connections on mobile device 302 through Wi-Fi™ 308, Bluetooth® 310, and infrared 314, in the event the connection through NFC 312 becomes unavailable or is lost while performing the transaction. In response to identifying a potential connection issue with NFC 312 and the merchant's terminal, parallel connection program 200 determines to perform a handoff of the transaction to another connection (i.e., connection protocol).

Figure 3B:
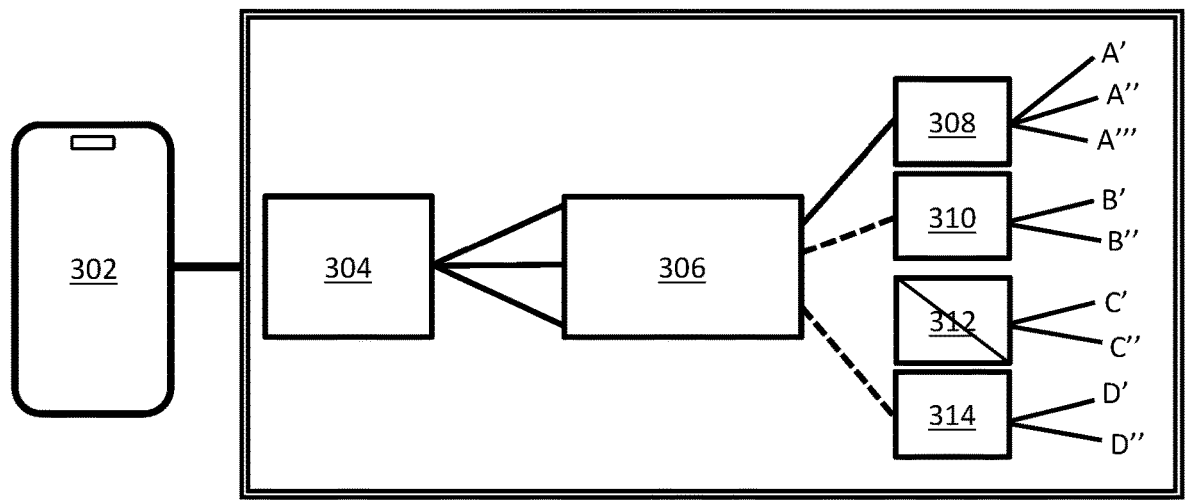
FIG. 3B depicts an illustrative example of a parallel connection program handing off a transaction between connections, in accordance with an embodiment of the present invention.

FIG. 3B depicts an illustrative example of a parallel connection program handing off a transaction between connections, in accordance with an embodiment of the present invention. Continuing from the example in FIG. 3A, parallel connection program 200 determines to perform the handoff of the transaction to another connection based on a distance threshold between NFC 312 of mobile device 302 and merchant's terminal exceeding a limit for a reliable connection. As a result, parallel connection program 200 performs a handoff of the transaction to another protocol connection, Wi-Fi™ 308, since the merchant's terminal is sharing a similar WIFI network (e.g., A") as mobile device 302. Parallel connection program 200 completes the transaction utilizing Wi-Fi™ 308 and notifies the user of mobile device 302 regarding the connectivity issue with NFC 312. Parallel connection program 200 can perform a diagnostic on NFC 312 and all associated hardware to ensure no issue is present. If no hardware issue is present, parallel connection program 200 can display a notification to the user of mobile device 302 that includes a recommendation to place mobile device 302 closer to the merchant's reader to ensure a reliable connection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    establishing a first connection to perform a transaction by a client device;
    identifying a plurality of available connections supported by the client device to perform the transaction;
    determining a priority for the client device and the transaction utilizing a second connection from the plurality of available connections, wherein each available connection represents a parallel connection to the first connection;
    allocating, based on the priority for the client device and the transaction, bandwidth for the second connection for the client device to perform the transaction;
    identifying at least one potential connectivity issue with the first connection based on a comparison between historical network data for the first connection and a current network data for the first connection; and
    performing a handoff of the transaction between the first connection and the second connection from the plurality of available connections.

2. The method of claim 1, further comprising:
    determining whether to perform the handoff of the transaction between the first connection and the second connection from the plurality of available connections based on a comparison between a first predicted bandwidth availability for the first connection and a second predicted bandwidth availability for the second connection; and
    determining to perform the handoff of the transaction between the first connection and the second connection based on the second predicted bandwidth availability being greater than the first predicted bandwidth availability.

3. The method of claim 1, further comprising:
    responsive to determining the transaction is complete via the second connection, notifying a user regarding the handoff between the first connection and the second connection from the plurality of available connections due to the at least one potential connectivity issue with the first connection.

4. The method of claim 1, further comprising:
    determining a plurality of priorities for a plurality of electronic devices and a plurality of transactions; and
    determining the priority for the client device and the transaction is greater than the plurality of priorities for the plurality of electronic devices and the plurality of transactions.

5. The method of claim 1, wherein the historical network data includes a threshold distance and threshold distance range for the first connection between the client device and a transaction processing device required for the transaction and the current network data includes a current distance between the client device and the transaction processing device.

6. The method of claim 1, wherein identifying the plurality of available connections supported by the client device to perform the transaction is based on one or more parameters selected from the group consisting of: a transaction type, one or more features of the client device performing the transaction, a connection range between the client device and another device required for the transaction, and an estimated time to initialize each available connection from the plurality of available connections.

7. The method of claim 6, wherein the estimated time to initialize each available connection from the plurality of available connections include the second connection and wherein the estimated time to initialize is based on a time of day, a day of a year, and an amount of existing connection traffic from a plurality of electronic devices.

8. A computer program product comprising:
    one or more computer readable storage media; and program instructions stored on the one or more computer readable storage media to perform operations comprising:
  establishing a first connection to perform a transaction by a client device;
  identifying a plurality of available connections supported by the client device to perform the transaction;
  determining a priority for the client device and the transaction utilizing a second connection from the plurality of available connections, wherein each available connection represents a parallel connection to the first connection;
  allocating, based on the priority for the client device and the transaction, bandwidth for the second connection for the client device to perform the transaction;
  identifying at least one potential connectivity issue with the first connection based on a comparison between historical network data for the first connection and a current network data for the first connection; and
  performing a handoff of the transaction between the first connection and the second connection from the plurality of available connections.

9. The computer program product of claim 8, wherein the operations further comprise:
  determining whether to perform the handoff of the transaction between the first connection and the second connection from the plurality of available connections based on a comparison between a first predicted bandwidth availability for the first connection and a second predicted bandwidth availability for the second connection; and
  determining to perform the handoff of the transaction between the first connection and the second connection based on the second predicted bandwidth availability being greater than the first predicted bandwidth availability.

10. The computer program product of claim 8, wherein the operations further comprise:
  responsive to determining the transaction is complete via the second connection, notifying a user regarding the handoff between the first connection and the second connection from the plurality of available connections due to the at least one potential connectivity issue with the first connection.

11. The computer program product of claim 8, wherein the operations further comprise:
  determining a plurality of priorities for a plurality of electronic devices and a plurality of transactions; and
  determining the priority for the client device and the transaction is greater than the plurality of priorities for the plurality of electronic devices and the plurality of transactions.

12. The computer program product of claim 8, wherein the historical network data includes a threshold distance and threshold distance range for the first connection between the client device and a transaction processing device required for the transaction and the current network data includes a current distance between the client device and the transaction processing device.

13. The computer program product of claim 8, wherein identifying the plurality of available connections supported by the client device to perform the transaction is based on one or more parameters selected from the group consisting of: a transaction type, one or more features of the client device performing the transaction, a connection range between the client device and another device required for the transaction, and an estimated time to initialize each available connection from the plurality of available connections.

14. The computer program product of claim 13, wherein the estimated time to initialize each available connection from the plurality of available connections include the second connection and wherein the estimated time to initialize is based on a time of day, a day of a year, and an amount of existing connection traffic from a plurality of electronic devices.

15. A computer system comprising:
  a processor set;
  one or more computer readable storage media; and
  program instructions stored on the one or more computer readable storage media to cause the processor set to perform operations comprising:
    establishing a first connection to perform a transaction by a client device;
    identifying a plurality of available connections supported by the client device to perform the transaction;
    determining a priority for the client device and the transaction utilizing a second connection from the plurality of available connections, wherein each available connection represents a parallel connection to the first connection;
    allocating, based on the priority for the client device and the transaction, bandwidth for the second connection for the client device to perform the transaction;
    identifying at least one potential connectivity issue with the first connection based on a comparison between historical network data for the first connection and a current network data for the first connection; and
    performing a handoff of the transaction between the first connection and the second connection from the plurality of available connections.

16. The computer system of claim 15, wherein the operations further comprise:
  determining whether to perform the handoff of the transaction between the first connection and the second connection from the plurality of available connections based on a comparison between a first predicted bandwidth availability for the first connection and a second predicted bandwidth availability for the second connection; and
  determining to perform the handoff of the transaction between the first connection and the second connection based on the second predicted bandwidth availability being greater than the first predicted bandwidth availability.

17. The computer system of claim 15, wherein the operations further comprise:
  responsive to determining the transaction is complete via the second connection, notifying a user regarding the handoff between the first connection and the second connection from the plurality of available connections due to the at least one potential connectivity issue with the first connection.

18. The computer system of claim 15, wherein the operations further comprise:
  determining a plurality of priorities for a plurality of electronic devices and a plurality of transactions; and
  determining the priority for the client device and the transaction is greater than the plurality of priorities for the plurality of electronic devices and the plurality of transactions.

19. The computer system of claim 15, wherein the historical network data includes a threshold distance and threshold distance range for the first connection between the client device and a transaction processing device required for the transaction and the current network data includes a current distance between the client device and the transaction processing device.

20. The computer system of claim 15, wherein identifying the plurality of available connections supported by the client device to perform the transaction is based on one or more parameters selected from the group consisting of: a transaction type, one or more features of the client device performing the transaction, a connection range between the client device and another device required for the transaction, and an estimated time to initialize each available connection from the plurality of available connections.

* * * * *